United States Patent [19]
Lavarenne

[11] 3,753,220
[45] Aug. 14, 1973

[54] AUXILIARY FLIGHT INSTRUMENT
[75] Inventor: Jean Rene Noel Lavarenne, Villecresnes, France
[73] Assignee: Societe Nationale Industrielle Aerospatiale, Paris, France
[22] Filed: Jan. 21, 1972
[21] Appl. No.: 219,675

[30] Foreign Application Priority Data
Jan. 28, 1971 France .................. 7102892

[52] U.S. Cl. ............................................. 340/27 R
[51] Int. Cl. ................................................ G01d 7/02
[58] Field of Search .................. 340/27 R, 27 AT, 340/27 NA, 27 SS; 73/178 R; 40/106.52, 106, 53

[56] References Cited
UNITED STATES PATENTS
3,085,429 4/1963 Majendie ........................ 340/27 R
3,096,504 7/1963 Fieldgate et al. ................ 340/27 R
3,176,265 3/1965 Schweighofer ................. 340/27 AT
3,191,147 6/1965 Majendie ........................ 340/27 R
3,634,959 1/1972 Goodrich ........................ 340/27 R Primary Examiner—Kathleen H. Claffy
Assistant Examiner—Thomas L. Kundert
Attorney—Karl W. Flocks

[57] ABSTRACT

Auxiliary flight instrument, particularly a blind flying instrument comprising a rotating member bearing on one of its surfaces a pattern which through a stroboscopic effect is either visible or invisible depending on the rotation speed of said member, said pattern being devised so as to provide the pilot, when lacking exterior visual references, with a reflex-prompting display under blind flying conditions similar to when visual piloting conditions obtain.

9 Claims, 7 Drawing Figures

AUXILIARY FLIGHT INSTRUMENT

The present invention relates to an auxiliary flight instrument and more particularly to an instrument which, under conditions similar to those of visual flying, gives the pilot figurative warning indications and tells him what action to take by utilizing the reflex prompting capabilities of his peripheral vision.

When landing or taking off, an aircraft pilot enjoys the ability to process, more or less consciously, the visual indications concerning the dynamic disposition of the elements making up the runway environment. With his gaze fixed straight ahead, he nevertheless perceives, within his total field of vision, the dynamic elements which represent the peripheral regions and which impress themselves on the portion of the eye's retina that surrounds the central zone of concentrated vision.

In-flight tests have shown that the pilot is made instantly aware of any anomaly through peripheral vision even before he has an exact notion of what is happening. This is because the visual marks indicate a change with respect to some stable pattern characteristic of the commanded flight situation, this stable pattern having been recognized by sheer piloting experience as corresponding to a normal situation prior to the change. It is therefore clearly of advantage to be able to ensure that changes in relation to a stable pattern should attract the pilot's attention immediately under blind or semi-blind flying conditions and thus possess informative value having some of the useful characteristics of visual flight.

Already known are piloting devices positioned above the instrument panel or on the sides of the cockpit which make use of peripheral vision by causing a geometrical figure such as a propeller or a lattice of oblique lines to move in one of two opposite directions in response to a command signal that translates the sense of the algebraic difference between the commanded or normal magnitude of a piloting input and the actual magnitude of that input.

This means that the cylinder, disc or band supporting the geometrical figure capable of moving in opposite directions is motionless when there is no command signal because the aircraft is flying under the required normal conditions. Technically speaking, therefore, response to the command signal involves the more or less instantaneous activation of a mechanical element, with reversal about a neutral position. As a rule, this type of servo operation virtually precludes instant, reliable response; further, in the event of failure of the system, a flap is required to mask the window through which the geometrical figures are viewed.

The present invention accordingly provides a pattern inscribed on a movable member which is normally rotated within the pilot's peripheral field of view at a speed that is responsive to a command signal. When the movable member is rotated at its normal speed, part of the pattern inscribed on it is caused to be permanently invisible by a stroboscopic effect resulting from the retina's property of retention, this part of the pattern being made to reappear in the event of a reduction in rotation speed as a function of an error signal which is generated when, say, the aircraft deviates from the planned flight path, thereby to warn the pilot accordingly under conditions similar to those of visual flight.

The description which follows of a possible embodiment of the invention, given with reference to the accompanying non-limitative exemplary drawings, will give a clear understanding of how the invention can be carried into practice.

Figure 1:
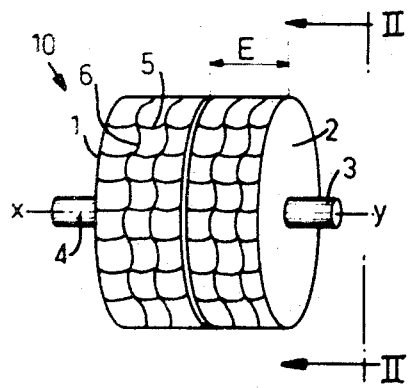
FIG. 1 shows an instrument according to the present invention.
Figure 2:
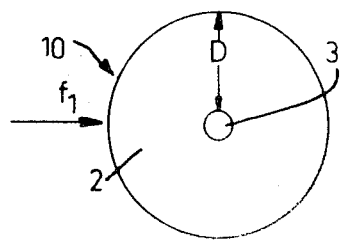
FIG. 2 is a view on the arrows II—II of FIG. 1.
Figure 3:
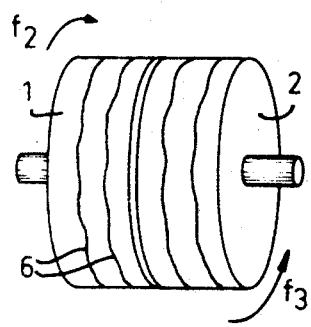
FIG. 3 is a view corresponding to FIG. 1 showing the instrument as it appears under normal flight conditions.

Referring first to FIGS. 1 and 2, there is shown thereon a flight instrument 10 having two drums 1 and 2 each of which has a diameter D of ten centimetres, for instance, and a thickness E of three centimetres.

Drums 1 and 2 are independently supported on two driving axles (schematically designated 3 and 4), coaxially positioned upon a common axis $x$–$y$ and driven by individual motors (not shown).

Provided on the outer cylindrical surfaces of drums 1 and 2 is a chequered pattern of dark lines against a light background, consisting for instance of lines 5 parallel to the rotation axis $x$–$y$ and to the cylinder generatrixes, and circles 6 intercepting the lines 5 at right angles.

When the motors are out of circuit, the drums, as seen by the pilot in the direction of arrow $f_1$, exhibit a chequered pattern (5,6) of dark lines on a light background, as shown in FIG. 1.

The present invention provides that under normal flight conditions the drums 1 and 2 be possessed, say, of rotating motion in opposite directions, the drum 1 in the direction of arrow $f_2$ and the drum 2 in the opposite direction, the speed being so chosen that the lines 5 which travel by due to the rotation of the drums become invisible to the retina of an observer's eye because of a stroboscopic effect, whereby only the set of circles 6 which lie in rotation planes perpendicular to the axis $x$–$y$ and are drawn in suitably bold solid or dash-lines, are perceivable to the pilot's peripheral vision and constitute an excellent peripheral vision stimulus for normal flight conditions.

Figure 6:
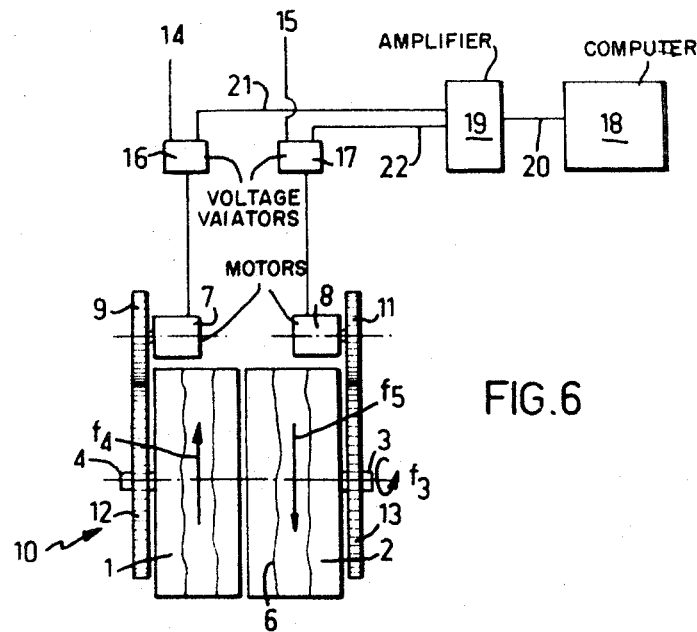
FIG. 6 is a detail view of an installation arrangement.

FIG. 6 illustrates an arrangement for controlling the flight instrument 10 according to this invention by means of two motors 7 and 8 which respectively drive two pinions 9 and 11 in opposite directions, which pinions mesh with gearwheels 12 and 13 angularly rigid with stub-axles 3 and 4.

Motors 7 and 8 are energized by means of two electric power lines 14 and 15 via two voltage variators 16 and 17.

Under normal flight conditions, the motors 7 and 8 rotate in opposite directions at the speed needed to achieve the stroboscopic effect whereby the pilot perceives only the motionless parallel tracks of the circular lines 6.

Figure 4:
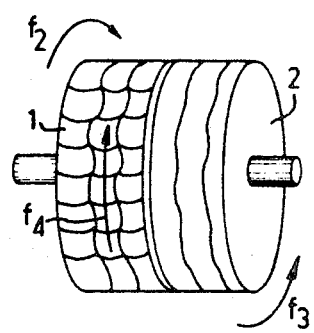
FIG. 4 shows the pattern on FIG. 3 as it appears subsequent to a command signal.

A computer unit, generally designated by block numeral 18, compares the required magnitude with the instantaneous magnitude of the flight parameter concerning which the instrument 10 is designed to furnish a visual indication of what action to take in order, say, to cancel out a possible deviation from a glide path beam during a landing approach. Where necessary, the computer 18 delivers into amplifier 19, via line 20, an error signal representing the difference between the command magnitude and the instantaneous magnitude, the effect of which is to introduce via line 21 a command signal which slows motor 7 by means of voltage variator 16. Since motor 7 causes the outer surface of the drum to rotate in the direction of arrow $f_4$, the slowing produced by the error signal causes the lines 5, which are invisible at normal motor speed, to reappear and to seem to the pilot to be gliding by in the direction of arrow $f_4$ (FIG. 4) at a speed inversely proportional to the extent of, say, the corrective diving moment required.

Similarly, if the line 22 introduces into variator 17 a nose-up signal, then the variation in voltage causes motor 8 to be slowed and consequently the drum 2 rotating in the direction of arrow $f_3$. This decrease in speed causes the chequer lines 5 to reappear and to glide past the pilot's eyes in the direction of arrow $f_5$ at a speed inversely proportional to the extent of the required corrective nose-up manoeuvre.

Figure 5:
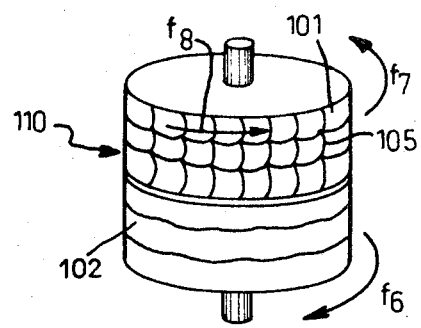
FIG. 5 is a corresponding view of a variant on FIG. 4.

In accordance with this invention, should the subject flight instrument be required to monitor the aircraft's approach heading with respect to the runway axis, a preferred embodiment is that designated 110 in FIG. 5. Drum 101, which rotates in the direction of arrow $f_7$ under normal flight conditions at sufficient speed for its chequer lines 105 to become invisible to the pilot, can be gradually slowed through the agency of a command computer which extracts the difference between two input data, to wit the runway axis azimuth and the instantaneous azimuth, whereby to cause lines 105 to gradually reappear in motion in the direction of the arrow $f_8$ to inform the pilot he must bear right.

Similarly, a slowing of drum 102 will indicate a need to bear left.

Figure 7:
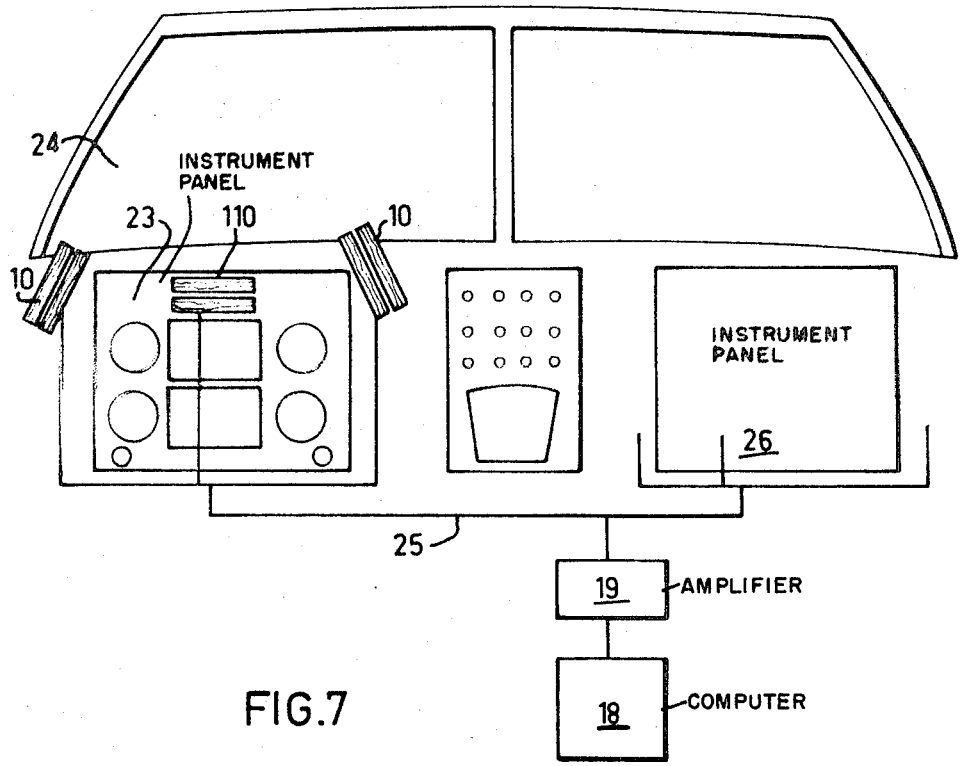
FIG. 7 shows an installation layout for an aircraft cockpit.

FIG. 7 shows an instrument panel 23 with conventional flight instruments and a windshield 24. The yaw stimulus instrument 110 and two pitch stimulus instruments 10 are arranged in the pilot's peripheral field of view. Command computers such as the computer 18 are suitably connected to amplifiers 19 and in accordance with this invention transmit the corrective-pilot-action signals via suitable transmission means 25 to the first pilot's instruments 10 and 110, with possible repetition to the instruments associated to the co-pilot's seat generally designated at 26.

In addition to the indications he derives from attentively reading the dials of instrument panel 23 or from seeking natural external landmarks in the 'head-up' position, the pilot is receptive to the reflexes prompted by the peripheral vision stimuli from the pitch and yaw indicators 10 and 110.

In the case of a pilot flying on instruments alone with the subject system of this invention, the reflex process of perception and interpretation can thus be closely likened to the process which is specific to visual flying.

The purpose of this invention is primarily to facilitate, under poor or zero visibility conditions,
  manual approaches and landings,
  the monitoring of these phases when they are carried out with an autopilot,
  ground rolls (whether automatic or not),
  take-offs,
and resumption of manual control when the autopilot system is released due to a malfunction or any other reason.

It goes without saying that changes and substitutions of parts may be made in the embodiment hereinbefore described without departing from the spirit and scope of the invention as set out in the appended claims. By way of example, the two drums could be mounted separately on two separate axles, while the changeable pattern subject to the stroboscopic effect could be drawn on the flat surface of a disc.

I claim:

1. Auxiliary flight instrument, particularly a blind flying instrument comprising at least two adjacently positioned side by side rotating members bearing on a surface of each a pattern of contrasting lines having at least lines substantially transverse to the direction of rotation which lines are visible during slower speeds of rotation but invisible during faster speeds of rotation of said members through stroboscopic effect, said pattern providing the pilot, when lacking exterior visual references, with a reflex-prompting display under blind flying conditions similar to when visual piloting conditions obtain.

2. A flight instrument as claimed in claim 1, characterized in that said rotating members are at least two drums continuously rotated at uniform speed and in opposite directions by two motors, each motor being energized through an independent transmission line which comprises a speed varying means having first and second inputs, a command computer delivering into said first input a signal responsively to a difference detected between two data relating to a specific piloting parameter, the motor power required to maintain a predetermined normal maximum angular velocity of the drum being applied to said second input, each drum bearing on its cylindrical surface a contrasted pattern so chosen that at said normal speed part of the pattern no longer be perceptible to the pilot's retina, a command signal emitted by the computer in the event of an erroneous flight manoeuvre being applied to said first input and thereby causing the angular velocity of the drum to be reduced whereby to cause the normally invisible part of the pattern to reappear, the erroneous situation requiring correction being thus made perceivable to the pilot in his peripheral field of view.

3. A flight instrument as claimed in claim 2, characterized in that said contrasted pattern includes a set of lines drawn substantially along generatrixes of the cylinder and a set of circles drawn at right angles thereto, said set of lines being invisible at the normal rotation speed of the drum and reappearing whenever said speed decreases responsively to said command signal for correcting a difference.

4. A flight instrument as claimed in claim 1, characterized in that the direction in which said lines appear to be moving past the pilot's eye when they reappear is designed to suggest both the magnitude and the sense of the corrective action the pilot must take on the flight controls in order to cancel out the error signal.

5. A blind flying instrument as claimed in claim 1, characterized in that each drum motor is energized through a two-input voltage variator of which one input receives the normal-speed power supply and the other input is connected to the command circuit of an amplifier for amplifying an error signal from a command computer.

6. A blind flying instrument as claimed in claim 5, characterized in that said command circuit emits a signal responsively to a difference between a commanded heading and an instantaneous heading.

7. A blind flying instrument as claimed in claim 5, characterized in that said command circuit emits a signal responsively to a difference with respect to a glide path beam.

8. A blind flying instrument as claimed in claim 1, characterized in that the stroboscopic pattern is engraved on a disc.

9. A blind flying method using a flight instrument as claimed in claim 1, including the steps of imparting a predetermined rotational speed to a member the peripheral surface of which bears a pattern that is subject to a stroboscopic effect, introducng into a speed varying means a command signal responsively to the difference between a commanded flight parameter and an instantaneous flight parameter, and reducing said predetermined rotational speed by means of said speed varying means, thereby to cause the reappearance on the surface of said member of a pattern that remains invisible at said predetermined speed due to the stroboscopic effect.

* * * * *